US010182137B2

United States Patent
Davis et al.

(10) Patent No.: US 10,182,137 B2
(45) Date of Patent: Jan. 15, 2019

(54) SYSTEM AND METHOD FOR PREVENTING CELL PHONE USE WHILE DRIVING

(71) Applicant: Text Free Enterprises, LLC, Deer Park, NY (US)

(72) Inventors: Todd M Davis, Coram, NY (US); William Bozsnyak, Huntington, NY (US); Edward Movsesyan, Commack, NY (US)

(73) Assignee: TEXT FREE ENTERPRISES, LLC, Deer Park, NY (US)

(*) Notice: Subject to any disclaimer, the term of this patent is extended or adjusted under 35 U.S.C. 154(b) by 0 days.

(21) Appl. No.: 15/685,000

(22) Filed: Aug. 24, 2017

(65) Prior Publication Data

US 2018/0069953 A1   Mar. 8, 2018

Related U.S. Application Data

(60) Provisional application No. 62/383,216, filed on Sep. 2, 2016.

(51) Int. Cl.
*H04M 3/00* (2006.01)
*H04M 1/60* (2006.01)
(Continued)

(52) U.S. Cl.
CPC ........... *H04M 1/6075* (2013.01); *H04M 1/66* (2013.01); *H04M 1/72577* (2013.01);
(Continued)

(58) Field of Classification Search
CPC .. H04M 1/6075; H04M 1/66; H04M 1/72577; H04M 3/42153; H04M 1/72569; H04M 2207/18; H04M 2250/02
(Continued)

(56) References Cited

U.S. PATENT DOCUMENTS 7,590,405 B2 *  9/2009  Ewell, Jr. ................ H04M 1/66
                                                          455/404.1
8,250,277 B2 *  8/2012  Tseng .................... G01C 21/265
                                                          710/303
(Continued)

OTHER PUBLICATIONS

Drive Alert Now "Drive Alert for Your Family, How to Prevent Teens Texting While Driving" Publication (online), Aug. 8, 2016, Retrieved from the internet.
(Continued)

*Primary Examiner* — Marceau Milord
(74) *Attorney, Agent, or Firm* — Arent Fox LLP

(57) ABSTRACT

A system and method is provided for preventing cell phone use while driving. The method includes determining by a cell phone if the speed of the vehicle is greater than zero miles per hour, and, if so, transmitting a command request to a locking module wirelessly coupled to the mobile device. In response to the command request, the microcontroller generates a locking operation signal that is sent to the cell phone. Upon receipt, the cell phone locks operation of the device by a user. In this aspect, the microcontroller generates the locking operation signal to mimic a locking command from a wireless keyboard paired with the cell phone in order to circumvent any control by the operating system of the cell phone to restrict such controls by software applications.

15 Claims, 7 Drawing Sheets

(51) Int. Cl.
*H04M 1/66* (2006.01)
*H04M 3/42* (2006.01)
*H04M 1/725* (2006.01)

(52) U.S. Cl.
CPC .... *H04M 3/42153* (2013.01); *H04M 1/72569* (2013.01); *H04M 2207/18* (2013.01); *H04M 2250/02* (2013.01)

(58) Field of Classification Search
USPC ............ 455/418, 410, 411, 450, 552.1, 557, 455/67.11
See application file for complete search history.

(56) References Cited

U.S. PATENT DOCUMENTS

| | | | | |
|---|---|---|---|---|
| 8,355,751 | B2* | 1/2013 | Dietz | H04M 1/72577 455/556.1 |
| 8,385,880 | B2* | 2/2013 | Ewell, Jr. | H04M 1/66 455/404.1 |
| 8,527,013 | B2 | 9/2013 | Cuba et al. | |
| 8,676,466 | B2* | 3/2014 | Mudalige | G08G 1/22 370/252 |
| 8,818,725 | B2* | 8/2014 | Ricci | H04W 4/90 701/519 |
| 9,020,482 | B2* | 4/2015 | Jones | H04W 4/027 455/418 |
| 9,037,125 | B1* | 5/2015 | Kadous | H04M 1/72577 455/418 |
| 9,106,740 | B2* | 8/2015 | Jung | H04M 1/72563 |
| 9,253,728 | B2* | 2/2016 | MacGougan | H04W 52/0254 |
| 9,398,421 | B2* | 7/2016 | Guba | H04W 4/027 |
| 9,571,629 | B2* | 2/2017 | Kadous | H04M 1/72577 |
| 9,832,306 | B2* | 11/2017 | Kadous | H04M 1/72577 |
| 9,872,225 | B2* | 1/2018 | Guba | H04W 4/027 |
| 2008/0096613 | A1* | 4/2008 | Karino | H04B 1/082 455/569.2 |
| 2008/0221743 | A1* | 9/2008 | Schwarz | G06Q 30/06 701/2 |
| 2009/0215466 | A1* | 8/2009 | Ahl | H04M 1/66 455/456.1 |
| 2009/0309787 | A1* | 12/2009 | Gildea | G01C 21/3641 342/357.31 |
| 2009/0312038 | A1* | 12/2009 | Gildea | G01S 19/52 455/456.4 |
| 2010/0009626 | A1* | 1/2010 | Farley | H04M 1/67 455/26.1 |
| 2010/0130182 | A1* | 5/2010 | Rosen | G06K 9/00785 455/414.1 |
| 2010/0197351 | A1* | 8/2010 | Ewell, Jr. | H04M 1/66 455/565 |
| 2010/0216509 | A1* | 8/2010 | Riemer | H04M 1/72577 455/557 |
| 2011/0021234 | A1 | 1/2011 | Tibbitts et al. | |
| 2012/0040650 | A1* | 2/2012 | Rosen | H04M 3/2218 455/414.1 |
| 2012/0129544 | A1* | 5/2012 | Hodis | G01S 19/34 455/456.1 |
| 2012/0239223 | A1* | 9/2012 | Schwarz | G06Q 30/06 701/2 |
| 2012/0252350 | A1* | 10/2012 | Steinmetz | H04K 3/415 455/1 |
| 2014/0248864 | A1* | 9/2014 | Rangarajan | H04W 4/50 455/418 |
| 2014/0335902 | A1* | 11/2014 | Guba | H04W 4/027 455/456.4 |
| 2015/0087264 | A1* | 3/2015 | Goyal | G01S 19/34 455/411 |
| 2016/0073324 | A1 | 3/2016 | Guba et al. | |
| 2017/0039784 | A1* | 2/2017 | Gelbart | G06Q 30/0206 |
| 2017/0078948 | A1* | 3/2017 | Guba | H04W 4/027 |

OTHER PUBLICATIONS

International Search Report for PCT/US2017/049448, dated Nov. 17, 2017.

* cited by examiner

Fig. 4A

SYSTEM AND METHOD FOR PREVENTING CELL PHONE USE WHILE DRIVING

CROSS REFERENCE TO RELATED APPLICATIONS

This application claims priority to U.S. Patent Provisional No. 62/383,216, filed Sep. 2, 2016, the entire contents of which are hereby incorporated by reference.

FIELD OF TECHNOLOGY

The present disclosure generally relates to controlling cell phone operation, and, more, specifically, to a system and method for preventing cell phone use while driving.

BACKGROUND

In recent years, the U.S. Department of Transportation has launched numerous programs and initiatives to reduce traffic-related fatalities and injuries. Moreover, many states explicitly prohibit talking, text-messaging or playing video games on hand-held mobile phones while driving. Additionally, a number of states, such as California, have passed laws banning or restricting young drivers (under age 18) from using mobile phones, or other types of mobile devices while driving. However, despite these attempts by the federal government and various states from protecting drivers from causing traffic related incidents as a result of cell phone use while driving, it is apparent that many drivers (especially teenage drivers) tend to ignore these rules.

For example, nearly half of all high school students sixteen and older text and email while driving. Moreover, nearly one fourth of teenage drivers say they answer at least one text message every time they drive. In fact, current statistics real that eleven teen drivers die every day while texting and driving. Teenage drivers are four times more likely to get into a distracted driving accident than their parents and teen texting and driving makes them twenty-three times more likely to crash.

Accordingly, a system is needed to prevent distracted driving by eliminating cell phone use during driving. While certain technologies exist that help reduce these problems, there are also current technological restrictions for certain cell phones, such as Apple's iPhone® that inhibit a software application's ability to effectively block the operation of the iPhone during a specified time (e.g., while the user of the mobile device is driving).

SUMMARY

According, as described herein, the proposed method and system provides an effective blocking solution to lock a cell phone. In general, on all Apple iPhones® (and other mobile devices, the user can press the power button and that will power down the screen (lock the phone). However, there is no way to programmatically press the power button via application installed. However, if the cell phone is connected to a wireless Bluetooth keyboard, the user can press the power button on the keyboard and that power command will be sent to the phone. Moreover, the cell phone will be locked and phone calls (and other user actions) will be disconnected just as if user pressed the power button. Thus, according to the disclosure herein, the system and method circumvents any control by the operating system of the cell phone to restrict such controls by software applications.

Thus, a system and method is provided for preventing cell phone use while driving. The method includes determining by a cell phone if the speed of the vehicle is greater than zero miles per hour, and, if so, transmitting a command request to a locking module wirelessly coupled to the mobile device. In response to the command request, the microcontroller generates a locking operation signal that is sent to the cell phone. Upon receipt, the cell phone locks operation of the device by a user.

Moreover, according to an exemplary aspect, the system includes a microcontroller; and a mobile device wirelessly coupled to the microcontroller. In this regard, the mobile device includes a transceiver configured to receive data indicating a speed of the vehicle, and a processor configured to determine whether the speed of the vehicle is greater than zero miles per hour, and, if the speed is greater than zero miles per hour, generate a command request to be transmitted to the microcontroller. According to the disclosed system in response to the command request, the microcontroller is configured to generate and transmit a locking operation signal to the mobile device. Moreover, the mobile device locks operation upon receipt of the locking operation signal.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 4A and 4B illustrate screenshots if of the software application providing alerts and settings information to a user according to an exemplary aspect.

DETAILED DESCRIPTION

Figure 1:
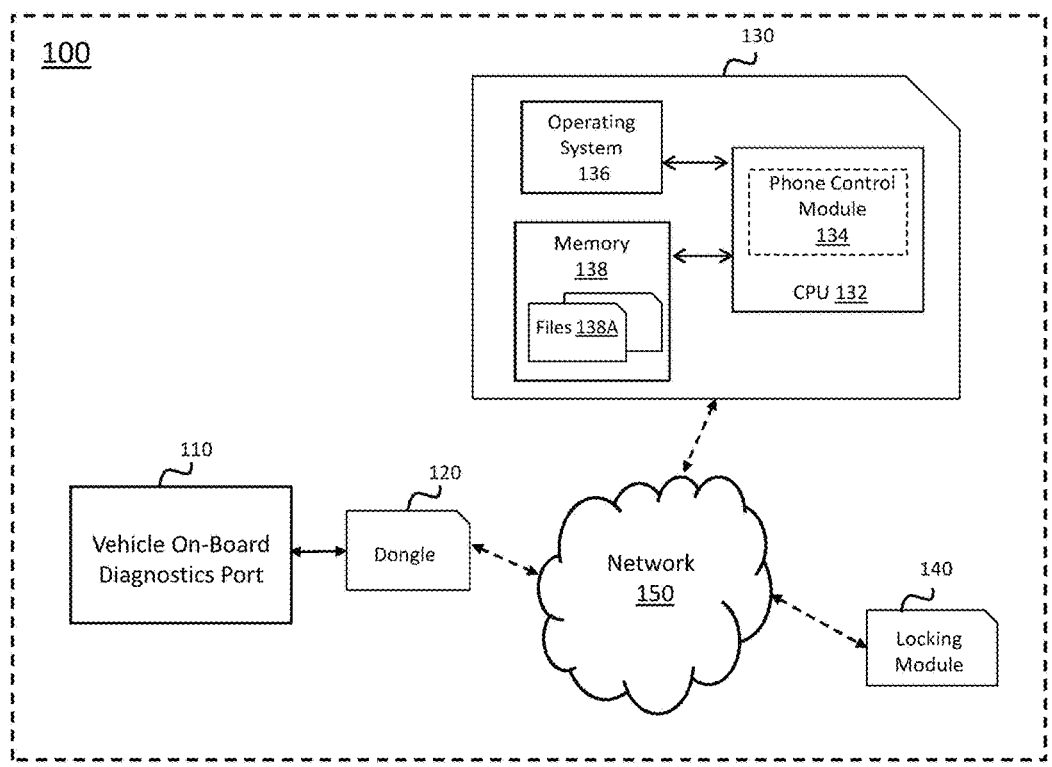
FIG. 1 is a block diagram illustrating the system for preventing cell phone use while driving according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1 is a block diagram illustrating the system for preventing cell phone use while driving according to an exemplary aspect. In general, it is contemplated that the system 100 is provided within a vehicle to control/prevent operation of a mobile device 130 while the vehicle is in operation and/or moving. As shown, the system 100 includes a vehicle on-board diagnostics ("OBD") port 110, a dongle 120, the mobile device 130, a locking module 140, and a network 150 that facilitates wireless communication between the devices, include the dongle 120, the mobile device 130 and the locking module 140. In this aspect, the network 150 can be, for example, a personal area wireless network using Bluetooth communication technology and protocols in which each of the devices is configured to communicate with one another using short-wavelength UHF radio waves, for example. The wireless communication is illustrated by dashed two-way arrows from devices 120, 130, and 140 to and from network 150. In the exemplary aspect, the mobile device 130 communicates directly with each of the dongle 120 and the locking module 140 using Bluetooth communication. More particularly, the dongle 120 first communicates with the mobile device 130 using Bluetooth and then the mobile device 130 communicates with the locking module using Bluetooth communication. In an alternative embodiment, the dongle 120 and the locking module 140 can communicate directly with each other using Bluetooth communication.

Moreover, according to the exemplary aspect, the dongle 120 is provided to obtain the vehicles speed and other information (e.g., engine operation, etc.) from the vehicle's OBD system.

As is known to those skilled in the art, the vehicle's OBD system provides self-diagnostic and reporting capability that can enable a vehicle owner or mechanic to access information about the engine and other vehicle sub-systems. Moreover, currently manufactured motor vehicles are now equipped with a standard OBD-II or EOBD connector port. The OBD connection port can provide real-time engine data (including vehicle speed) in addition to standardized diagnostic trouble codes that allow a mechanic to rapidly identify and remedy problems with the vehicle.

In the exemplary aspect, the dongle 120 can be, for example, an OBD-2 dongle that includes a physical connector that can be plugged into (i.e., mated with) the OBD port 110, preferably on a long-term basis, to receive the OBD data, such as vehicle speed, and power. The connection between dongle 120 and OBD port 110 is illustrated by a solid two-way arrow. In addition to the preferred implementation (i.e., to block cell phone operation during vehicle operation), it is contemplated that the dongle 120 can also automatically track driving habits (e.g., speeding incidents, and the like) and provide reporting information that can be sent to a parent's computing device, for example.

The hardware of existing dongles is well known in the art and will not be described in detail herein. However, according to the exemplary aspect, the dongle 120 can include a processor (e.g., a microcontroller), optional memory (such as a flash memory), a short-range wireless transceiver, as well as other various hardware components. The wireless transceiver is provided for pairing with the mobile device 130 to wirelessly transmit OBD data. Thus, during operation, the dongle 120 is configured to receive the OBD data from the OBD port 110 while the vehicle is in operation/moving (e.g., "on" and "off" states of the engine as well as non-zero values for speed, for example) and transmit this data in real-time to the mobile device 130 using the transceiver for Bluetooth communication via network 150. In an alternative aspect, the dongle 120 may temporarily store the OBD data in memory and transmit the OBD to the mobile device 130 on a periodic basis (e.g., once per second or the like) or in response to a prompting request from the mobile device 130.

Figure 5:
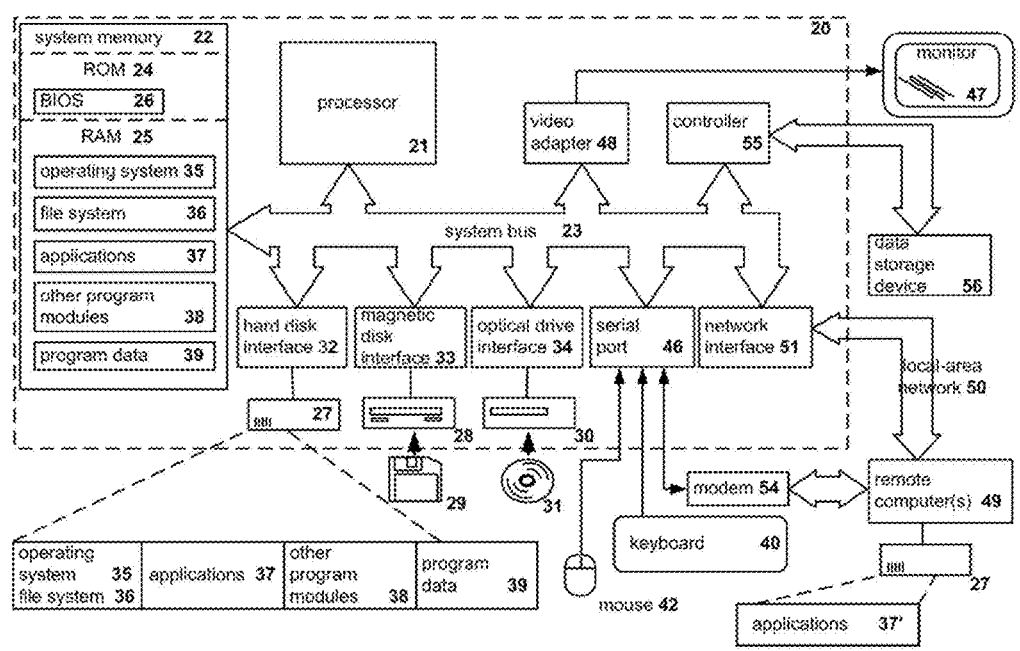
FIG. 5 illustrates an example of a general-purpose mobile device on which the disclosed systems and method can be implemented.

Furthermore, the mobile device 130 can be a smartphone, such as Apple iPhone®, that includes a computer-processing unit ("CPU") 132, an operating system 136 (e.g., Apple iOS) and memory 138. An example of the hardware of the mobile device 130 is shown in FIG. 5 and will be described in detail below. However, in general, a phone control module 112 (e.g., a downloadable software application from an "Apps store") is provided that includes software code (e.g., processor executable instructions) in memory, which may be configured to execute/facilitate the algorithms described herein. CPU 132 is configured to execute the phone control module 112, as will be described in greater detail below. Furthermore, memory 138 is provided to store OBD data received from dongle 120 and can be a typical computer-readable medium including data storage that can be found on a smartphone, such as RAM, ROM, EEPROM, flash memory or the like.

Moreover, as used herein, the term "module" refers to a software service or application executed on the various devices and is implemented using a combination of the specific device's hardware and software, such as by the microcontroller and a set of instructions to implement the module's functionality, which (while being executed) transform the microcontroller system into a special-purpose device. Each module can also be implemented as a combination of the two, with certain functions facilitated by hardware alone, and other functions facilitated by a combination of hardware and software. Each module can be realized in a variety of suitable configurations, and should not be limited to any example implementation exemplified herein.

As further shown in FIG. 1, system 100 includes the locking module 140, which is a programmable Bluetooth communication module according to the exemplary aspect. For example, an off-the-shelf programmable module, such as the HC-08 Bluetooth UART Communication Module, can be implemented as the microcontroller of the locking module 140. The details of locking module 140 will be described below with respect to FIG. 2, but locking module 140 generally is a module that has been programmed to act and emulate as a wireless keyboard in communication with mobile device 130. In this manner, the locking module 140 is configured to emits a wireless Bluetooth signal that makes mobile device 130 (e.g., an Apple iPhone®) think that that the locking module 140 is a wireless keyboard. As a result, after this signal (module) is paired with the mobile device 130, the locking module 140 can send the lock command, which will not be blocked by the operating system 136 of the mobile device 130.

Furthermore, the locking module 140 is programmed to accept commands (and related data) using the Bluetooth communication protocols from the mobile device 130 as well. Thus, according to the exemplary aspect, when speed is detected by dongle 120 and transmitted to mobile device 130, the mobile device 130 (that is unlocked) can send the data to locking module 140, which, in turn, sends the lock command back to the mobile device 130. In one aspect, because the mobile device 130 tells the locking module 140 when the lock command should be sent, the mobile device 130 can also ensure that the phone is not locked if an emergency phone operation (e.g., dial "9-1-1") needs to be initiated, for example.

Figure 2:
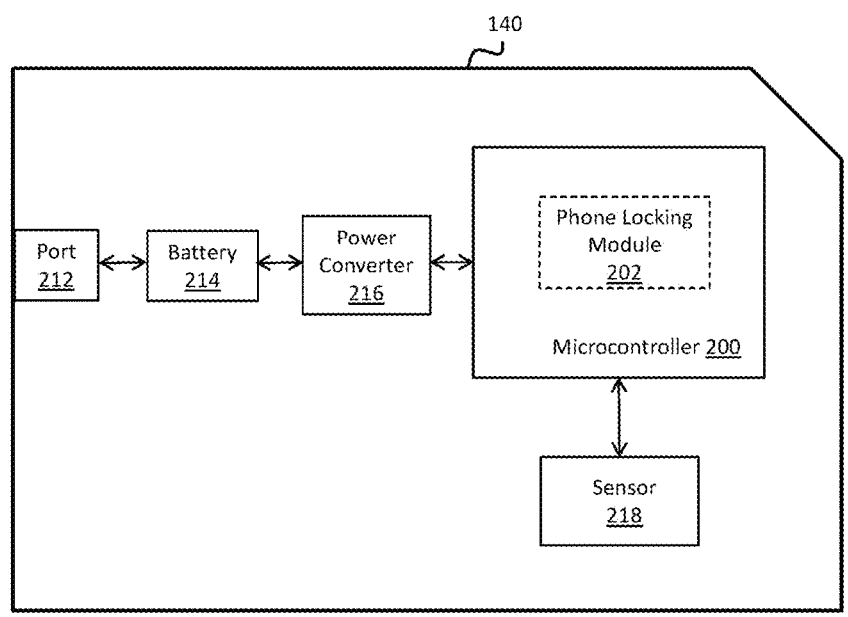
FIG. 2 is a block diagram illustrating the locking module 140 for preventing cell phone use while driving according to an exemplary aspect.

FIG. 2 is a block diagram illustrating the locking module 140 for preventing cell phone use while driving according to an exemplary aspect. As noted above, the locking module 140 can include a microcontroller 200, which can be, for example, the HC-08 Bluetooth UART Communication Module according to one exemplary aspect. The hardware components of such a module are well known and will not be repeated herein. The datasheet for the HC-08 module is described at: http://www.wavesen.com/mysys/db_picture/news3/2015121885416101.pdf, the contents of which are hereby incorporated by reference. As described therein, the HC-08 module firmware operates at a working voltage between 2 volts to 3.6 volts and operates in a range of 8 to 10 meters. Moreover, the HC-08 module is an ultra-low power Bluetooth protocol v4.0 module that can operate as either a master or a slave device. The microcontroller 200 of the locking module 140 can include pins, e.g., VCC (Pin 12) and GND (Pin 13), provided for power consumption. It should be appreciated that the microcontroller 200 of the locking module 140 is not limited to the HC08 module. Rather, the HC-08 module is a cheaper alternative to HC-10 (which can also be used). Moreover, the Texas Instrument® chip (CC2540) can also be utilized (http://www.ti.com/product/CC2540), for example.

As described above, the microcontroller 200 of the locking module 140 is pre-programmed to receive vehicle speed information (and other ODB data, for example) from the mobile device 130 and generate locking signals in response. In this regard, microcontroller 200 can be pre-programmed with the phone locking module 202, which is configured to perform these functions. Moreover, referring to the HC-08 module, for example, the PIO01 (Pin 32) or PIO00 (Pin 34) should be connected to the VCC (Pin 12), according to the exemplary aspect. In operation, these pins will instruct the locking module 140 when it should start to advertise itself (using Bluetooth communication) so that the mobile device 130 (e.g., an Apple iPhone®) can detect and interpret the locking mobile 140 as a keyboard device. In this aspect, the mobile device 130 will only be able to connect to the locking module 140 while the locking module 140 is transmitting such a signal. Once the locking module 140 is connected, it will maintain the connection and such an advertising signal is not required. Of course, during re-connect, the locking module 140 will need to transmit the advertising signal again.

Additional components of the locking module 140, as shown in FIG. 2, include a rechargeable battery 214, a port 212 (such as a USB port) that facilitates the charging of the rechargeable battery 214 (by a USB cable, for example), and a power converter 216 that converts power from the rechargeable battery 214 to the microcontroller 200 during operation. Optionally, the locking module 140 can also include one or more sensors 218, such as a sound sensor that is configured to initiate the advertising signal to the mobile device 130 once sound is detected. In other words, the locking module 140 may be kept in the automobile of the user. It will then only begin the connection process to the mobile device 130 if sensor 218 detects sound in the vehicle. Furthermore, although not specifically shown, the locking module can include a plastic board (to second the various components) and an outer casing for further protection.

Figure 3A:
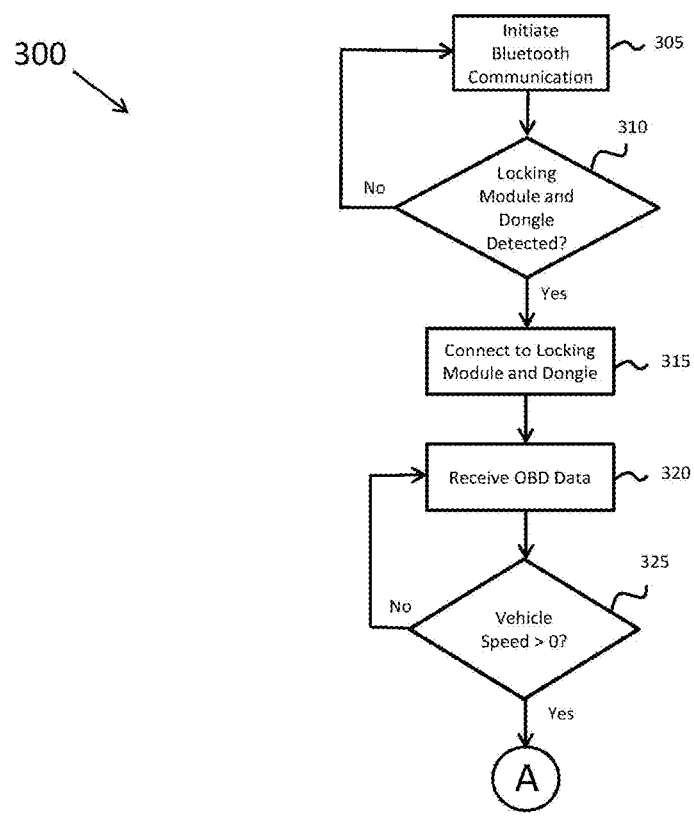
FIGS. 3A and 3B illustrate a flowchart of a method for preventing cell phone use while driving according to an exemplary aspect.
Figure 3B:
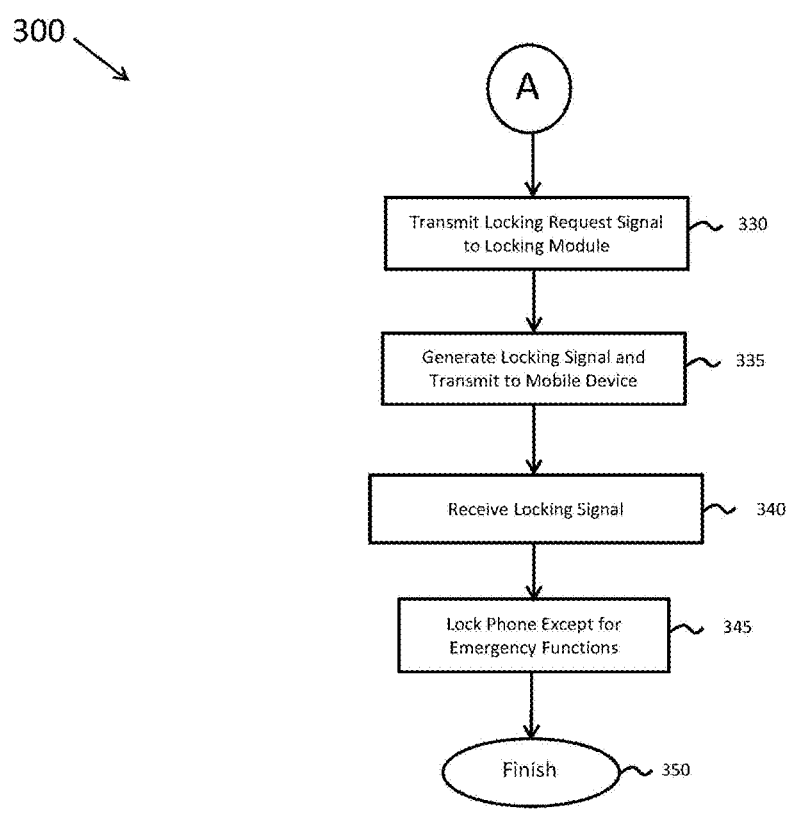

FIGS. 3A and 3B illustrate a flowchart of a method for preventing cell phone use while driving according to an exemplary aspect. Initially, at step 305, the mobile device 130 initiates wireless (e.g., Bluetooth) communication between each of the dongle 120 and the locking module 140. In particular, the mobile device 130 can sending a scanning/pairing signal to detect any devices (within range) that are configured to communicate by Bluetooth. Alternatively, or in addition as described above, the locking module 140 can transmit an advertising signal requesting pairing with the mobile device 130. In either case, at step 310, the mobile device 130 determines whether the dongle 120 and locking module 140 are detected. If so, at step 315, the mobile device 130 and each of the dongle 120 and locking module 140 are paired for wireless communication. If not, the method returns to step 305 to initiate Bluetooth communication. It should be appreciated that while steps 310 and 315 are illustrated as the mobile device 130 pairing with each of the dongle 120 and locking module 140 concurrently, these connection processes can also be performed in sequence.

In either case, once the dongle 120 and mobile device 130 are paired, the dongle 120 begins receiving OBD data (including vehicle speed) from the OBD port 110 and dynamically (i.e., in real-time) transmitting the vehicle speed to the mobile device 130, at step 320. In an alternative aspect, it is contemplated that the dongle 120 can be paired directly with the locking module 140 and can transmit the vehicle speed directly to the locking module 140.

At step 325, the mobile device 130, and, in particular phone control module 134, determines whether the vehicle speed is greater than 0 miles per hour ("MPH"). In other words, the phone control module 134 uses the received OBD data to determine whether the vehicle is moving. In an alternative aspect, the OBD data could indicate an engine "ON" status or the like to confirm that the vehicle is in operation. Other indications including detecting noise/sounds as discussed above, sensing vibration, sensing voltage in the ODB port 110, and the like. Any such data can be used as the trigger to block phone operation, although it is contemplated that the vehicle speed is the indicator in the exemplary aspect.

As further shown in FIG. 3A, if the OBD data indicates that the vehicle speed is not greater than 0 MPH, then the method returns to step 320 where the mobile device continues to receive OBD data from dongle 120. However, if the vehicle speed is greater than 0 MPH, the method proceeds to step 330 shown in FIG. 3B.

Specifically, a step 330, if the phone control module 134 determines that the vehicle is moving and that the phone is unlocked, the mobile device 130 transmits a control command to the locking module 140 request that a lock command be sent back to the mobile device 130. At step 335, the locking module 140 generates a locking command and sends it back to the mobile device 130. In general, a mobile device, such as an Apple iPhone® can be locked if a user presses the power button to power down the screen and effectively lock the phone. However, the operating system (e.g., iOS) of the phone prevent an application installed on the phone from mimicking the power down button command. Thus, according to the exemplary aspect, the mobile device 130 interprets the signals receiving from the locking module 140 as signals from a wireless keyboard. Moreover, wireless keyboards can effectively transmit locking signals to an Apple iPhone® and the operating system will accept these signals and lock the phone. In this manner, the phone will be locked, user operations (e.g., text and activating applications) will be blocked, and any phone calls will be disconnected. Thus, according to the exemplary aspect, the locking command sent from the locking module 140 to the mobile device 130 as interpreted as a locking command received from a wireless keyboard, which effectively locks the phone. Accordingly, as shown, the mobile device receives the signal at step 340 and is locked at step 345. In this aspect, the phone will typically phone be locked, unless the user request that he or she wants to place an emergency phone call, as described herein. The method finishes at step 350.

In one aspect, the locking module 140 (i.e., the locking command) mimics the wireless keyboard signal by using the HID ("human interface device") Profile that the iPhone recognizes as a native wireless keyboard. In general, the HID profile uses the universal serial bus ("USB") definition of the mobile device in order to leverage the existing class drivers for such devices. The HID profile describes how to use the USB HID protocol to discover a HID class device's feature set and how a Bluetooth enabled device can support HID services. The HID profile is designed to enable initialization and control self-describing devices as well as provide a low latency link with low power requirements. In the exemplary aspect, the locking module 140 must be paired with the mobile device 130 (e.g., the iPhone) upon first time use and after that iPhone will maintain the paired connection, as described herein. A power command is sent to the iPhone that locks the phone over Bluetooth signal according to an exemplary aspect, and this power signal will disconnect the phone call if it's in progress or lock the screen if phone is being used.

Figure 4A:
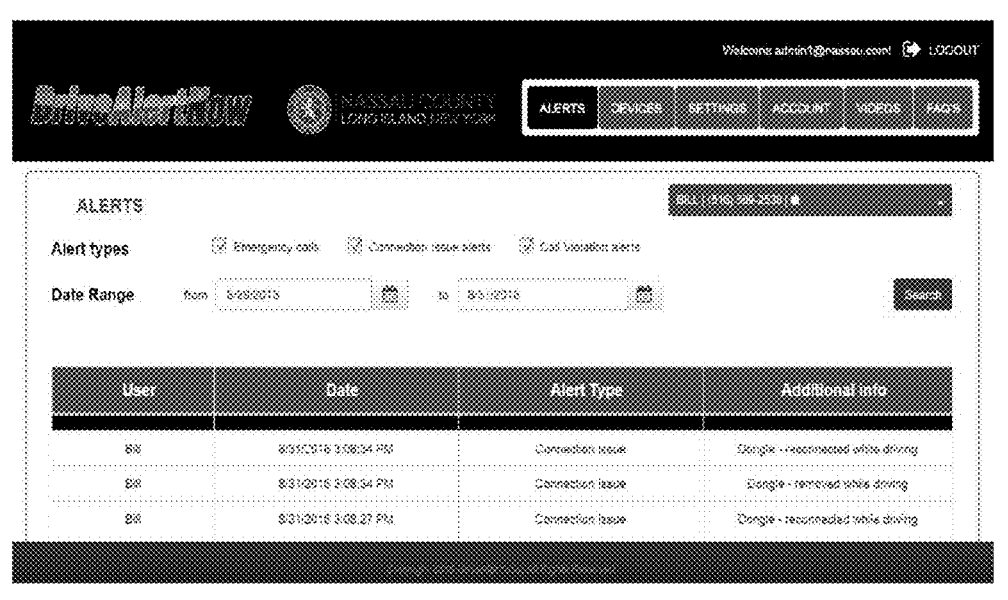
Figure 4B:
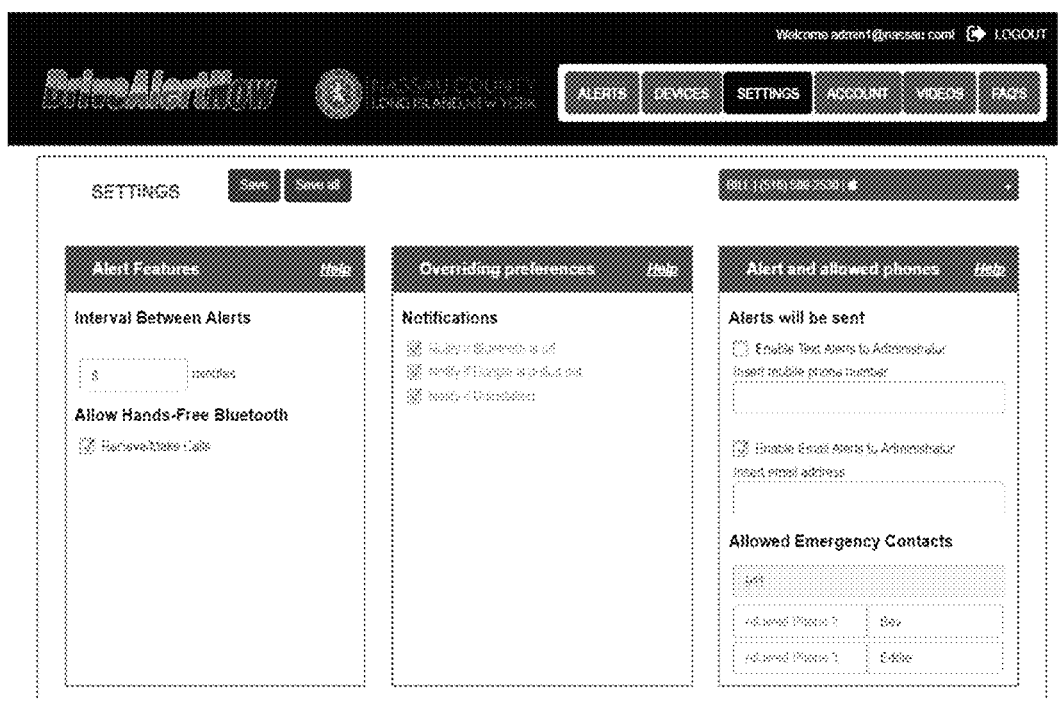

It should be appreciated that the locking operation on the mobile device 130 is maintained as long as the vehicle is in moving or in operation. Moreover, the phone control module 134 include capabilities that enable it to communicate with a server to log violations and misconfiguration of its settings. In particular, when the phone control module 134 is downloaded on the mobile device 130, which can be a teenage driver's phone for example, the parent can access a website that controls the configurations of the application (e.g., identifying the teenager's phone as being controlled by the application). In addition, the mobile device 130 transmits the driving data, alerts (see screenshot in FIG. 4A), dashboard settings and possible misconfigurations (see screenshot in FIG. 4B), etc., to a server that enables the parent to view the teenager's compliance with the system when the parent logs onto the website connected with the application and server.

Thus, according to the exemplary aspect, OBD data is provided by the dongle 120 to the mobile device 130, where it is interpreted to determine whether a request to the locking module 140 for a locking command should be generated. According to an alternative aspect, the vehicle speed data can be generated directly from the mobile devices 130's GPS system. However, this aspect has limitations in that GPS and speed data will be generated even if the user is walking. Thus, restrictions would likely be required to implement this aspect, such as defining a minimum speed for when the locking command is requested (e.g., the speed must be over 10 MPH). In yet another aspect, the OBD data can be transmitted directly from the dongle 120 to the locking module 140. However, this aspect has limitation in terms of the phone's ability to make emergency calls and the like. In other words, if the user has dialed "9-1-1", the system would not want to receive a locking signal from the locking module 140 that would disconnect the call. In contrast, according to the exemplary aspect, the phone control module 134 determines when a request is sent to the locking module 140 to request a locking command. In this regard, the phone control module 134 will not send this request if the phone is currently being used for an emergency service, for example.

In a further aspect, a compass can be used in place of the dongle to detect movement of the vehicle. The compass could be a stand-alone device in communication with the mobile device 130 and/or locking module 140, or can be a component (software or hardware) of either the mobile device 130 and/or locking module 140. In one aspect, any variation in the direction of the compass will inherently mean that the vehicle is moving (assuming the compass is fixed relative to the vehicle). Thus, upon a detection of movement, the locking algorithm described above can be implemented. Other sources of speed and/or movement of the vehicle can include a GPS module added into the locking module 140, a detection of a power fluctuation in the car's power outlet (by the dongle 120 or mobile phone 130 or locking module 140, for example), a detection of movement by monitoring outside car conditions (e.g., using a camera to detect change), sensors detecting vibration or sound (as discussed above) from the car, and the like. Such detections method can be implemented using the techniques described herein as should be appreciated.

FIG. 5 illustrates an example of a mobile on which the disclosed systems and method can be implemented according to an example aspect. It should be appreciated that the computing system shown can correspond to the mobile device 130 provided to implement the algorithms described above.

As shown, the mobile device 20 includes a central processing unit 21, a system memory 22 and a system bus 23 connecting the various system components, including the memory associated with the central processing unit 21. The central processing unit 21 can correspond to the CPU 132 and the system memory 22 can correspond to memory 138 of FIG. 1, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the mobile device 20, such as those at the time of loading the operating system with the use of the ROM 24.

The mobile device 20, in turn, includes a hard disk 27 for reading and writing of data, a magnetic disk drive 28 for reading and writing on removable magnetic disks 29 and an optical drive 30 for reading and writing on removable optical disks 31. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the mobile device 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The mobile device 20 has a file system 36, where the recorded operating system 35 is kept, and also additional program applications 37, other program modules 38 and program data 39. The user is able to enter commands and information into the mobile device 20 by using input devices (keyboard 40, mouse 42). Other input devices (not shown) can be used and usually plug into the mobile device 20 through a serial port 46, which in turn is connected to the system bus, but they can be connected in other ways, for example, a universal serial bus (USB). A monitor 47 or other type of display device is also connected to the system bus 23 across an interface, such as a video adapter 48.

As described above, the mobile device 20 is able to operate within a network environment, using a network connection to one or more remote device 49 (e.g., dongle 120 and locking module 140). Network connections can form a Bluetooth network (LAN) 50 and the mobile device 20 can employ a modem 54 or other modules for providing communications with a wide-area computer network such as the Internet. The modem 54, which is an internal device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for locking a mobile device during vehicle operation, the method comprising: receiving, by a mobile device, data indicating a speed of the vehicle; determining, by a processor of the mobile device, whether the speed of the vehicle is greater than zero miles per hour; when the processor determines the speed of the vehicle is greater than zero miles per hour, transmitting a command request to a microcontroller separate from the mobile device and wirelessly coupled to the mobile device, the command request being configured to request the microcontroller to generate a locking operation signal; in response to the command request, generating the locking operation signal by the microcontroller that is configured to mimic a wireless keyboard paired with the mobile device, such that the locking operation signal is configured to mimic a wireless keyboard command signal that prevents operation of the mobile device and configured to circumvent an operation system of the mobile device that is designed to restrict locking operation signals generated by software applications installed on the mobile device; transmitting, by the microcontroller, the generated locking operation signal to the mobile device; and locking the mobile device from operation upon receipt of the locking, operation signal received from the microcontroller.

2. The method of claim 1, further comprising coupling a dongle to an on-board diagnostics port of the vehicle.

3. The method of claim 2, further comprising:
receiving, by the dongle, the data indicating the speed of the vehicle from the on-board diagnostics port; and
transmitting the data indicating the speed of the vehicle to the mobile device.

4. The method of claim 1, further comprising receiving the data indicating the speed of the vehicle from GPS signals detected by the mobile device.

5. The method of claim 1, further comprising not transmitting, by the mobile device, the command request if the mobile device is performing an emergency operation.

6. The method of claim 1, further comprising transmitting the command request to the microcontroller only if the processor also determines that the mobile device is unlocked.

7. The method of claim 1, further comprising detecting a sound by a sound sensor of the microcontroller and wirelessly pairing the microcontroller with the mobile device when the sound is detected.

8. A system for locking a mobile device during vehicle operation, the system comprising: a microcontroller; and a mobile device wirelessly coupled to the microcontroller, the mobile device including: a transceiver configured to receive data indicating a speed of the vehicle, and a processor configured to determine whether the speed of the vehicle is greater than zero miles per hour, and, when the determined speed is greater than zero miles per hour, generate a command request to be transmitted to the microcontroller separate from the mobile device and wirelessly coupled to the mobile device, the command request being configured to request the microcontroller to generate a locking operation signal, wherein, in response to the command request, the microcontroller is configured to: generate the locking operation signal that is configured to mimic a wireless keyboard command signal that prevents operation of the mobile device and configured to circumvent an operation system of the mobile device that is designed to restrict locking operation signals generated by software applications installed on the mobile device, and transmit the generated locking operation signal to the mobile device, and wherein the mobile device locks operation upon receipt of the locking operation signal received from the microcontroller.

9. The system of claim 8, further comprising a dongle coupled to an on-board diagnostics port of the vehicle.

10. The system of claim 9, wherein the dongle is configured to:
receive the data indicating the speed of the vehicle from the on-board diagnostics port, and
transmit the data indicating the speed of the vehicle to the mobile device.

11. The system of claim 8, wherein the mobile device receives the data indicating the speed of the vehicle from GPS signals detected by the mobile device.

12. The system of claim 8, wherein the processor of the mobile device is configured to not transmit the command request if the mobile device is performing an emergency operation.

13. The system of claim 8, wherein the processor of the mobile device is configured to transmit the command request to the microcontroller only if the processor also determines that the mobile device is unlocked.

14. The system of claim 8, further comprising a sound sensor of the microcontroller configured to detect a sound and the microcontroller is configured to wirelessly pair with the mobile device when the sound is detected.

15. A device for locking a mobile device during vehicle operation, the device comprising:
a transceiver configured to wirelessly pair with the mobile device; and
a microcontroller configured to:
receive a command signal from the mobile device, wherein the command signal requests a locking command because the mobile device has determined a speed of the vehicle is greater than zero miles per hour,
in response to the command request, generate a locking operation signal configured to mimic a wireless keyboard command signal that prevents operation of the mobile device and configured to circumvent an operation system of the mobile device that is designed to restrict locking operation signals generated by software applications installed on the mobile device, and
wherein the transceiver is configured to transmit the generated locking operation signal to the mobile device, which upon receipt, locks operation of the mobile device by a user.

* * * * *